Nov. 23, 1965      M. J. GUNNLAUGSON      3,219,215
POLE HANDLING DEVICE
Filed April 15, 1963

INVENTOR
MATTHIAS JOCKUM GUNNLAUGSON

United States Patent Office 3,219,215
Patented Nov. 23, 1965

3,219,215
POLE HANDLING DEVICE
Matthias Jockum Gunnlaugson, 747 Lanark Bay,
Winnipeg, Manitoba, Canada
Filed Apr. 15, 1963, Ser. No. 273,149
4 Claims. (Cl. 214—147)

My invention relates to new and useful improvements in pole handling devices, specifically pole handling devices which are adapted to pick up poles from the ground or from a truck or the like, pivot same vertically and place them within holes in the ground. Alternatively the device is adapted to pull the poles from the ground and lay them horizontally upon the ground, or alternatively, to transport them from one place to another.

The conventional method of placing or removing power line or telephone poles consists of a crane adapted to tilt the pole into position with the stub of the pole in the hole. When it is desired to remove such poles, they can be pulled vertically but then have to be lowered to the ground and then loaded upon a truck or the like by other crane means.

All of this is extremely time consuming and requires the use of many men and various pieces of equipment.

I have overcome these disadvantages by providing a device which is adapted to be mounted upon and driven by a tractor. The device comprises a pair of jaws mounted upon a plate which can be rotated through 360 degrees and which also can be moved from horizontal to the vertical. This permits the pole to be lifted from the ground, placed in the hole, or withdrawn from the hole and placed upon the ground, or alternatively lifted from the ground and placed upon a truck or the like or, if desired, to be transported by the device slung between the wheels thereof.

The principal object and essence of my invention is therefore to provide a device of the character herewithin described which enables poles or trees to be erected or taken down as desired.

Another object of my invention is to provide a device of the character herewithin described which can be operated by one man thus realizing a considerable saving in labour charges.

A further object of my invention is to provide a device of the character herewithin described which can place and remove a series of poles rapidly and with the minimum of additional equipment.

Still a further object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
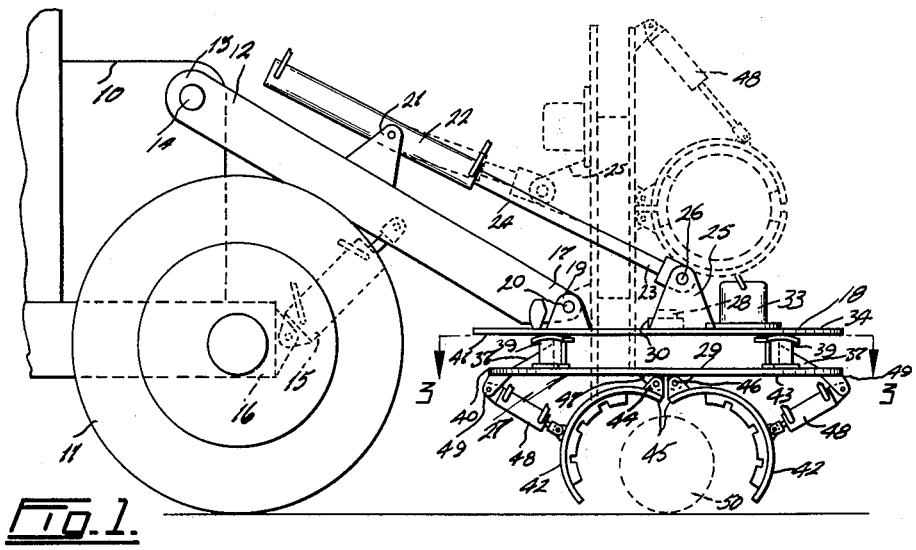
FIGURE 1 is a side elevation of my device shown in the horizontal position in full and in the vertical position in phantom.

Proceeding therefore to describe my invention in detail, reference character 10 illustrates a conventional tractor mounted upon front wheels 11. It is to be understood that this tractor is a prime mover and is provided with hydraulic pumps to supply the necessary power for the operation of my device.

A pair of spaced and parallel beams 12 are pivotally secured by the ends 13 thereof to the tractor 10 by means of pivot pin 14, one upon each side of the tractor. These beams extend forwardly and downwardly and are adapted to be pivoted in a vertical arc by means of an hydraulic piston and cylinder assembly 15 extending between the tractor frame 16 and the beams 12 intermediate the ends of the beams.

Upon the upper ends 17 of the beams, I have mounted a base plate 18 by means of lugs 19 situated upon the side of the circular base plate and adjacent the perimeter thereof, pivot pins 20 connecting the beam ends to the lugs 19.

Intermediate the ends of the beams 12 I have provided pairs of lugs 21, each pair pivotally supporting an hydraulic piston and cylinder assembly 22. The distal end 23 of the piston rods 24 are pivotally connected to lugs 25 by means of pivot pins 26 also upon the base plate 18 substantially one upon each side thereof as clearly shown in FIGURES 1 and 2.

Figure 2:
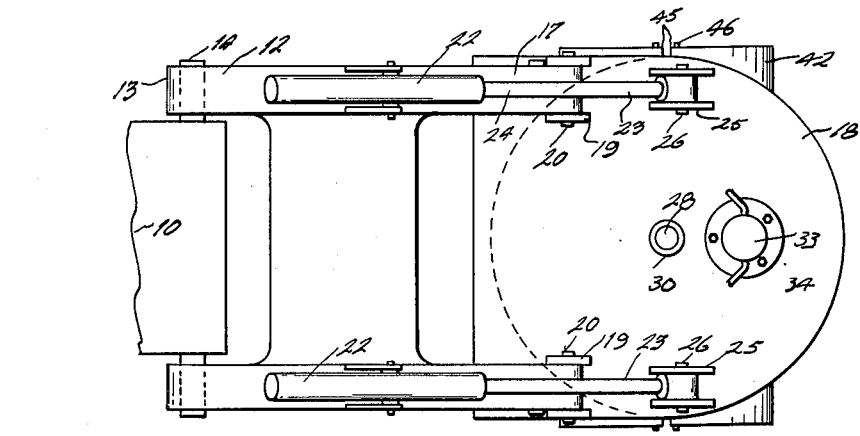
FIGURE 2 is a top plan view of my device.

From the foregoing it will be appreciated that operation of the piston and cylinder assembly 22 permits the base plate 18 to be positioned either horizontally as shown in full line in FIG. 1 or vertically as shown in phantom.

A jaw carrying plate collectively designated 27 is mounted for rotation in spaced and parallel relationship upon the base plate 18. In this connection a centrally located stub shaft 28 extends from the base plate side 29 and centrally through the base plate, a collar 30 securing the plate 27 for rotation upon the base plate 18.

Figure 3:
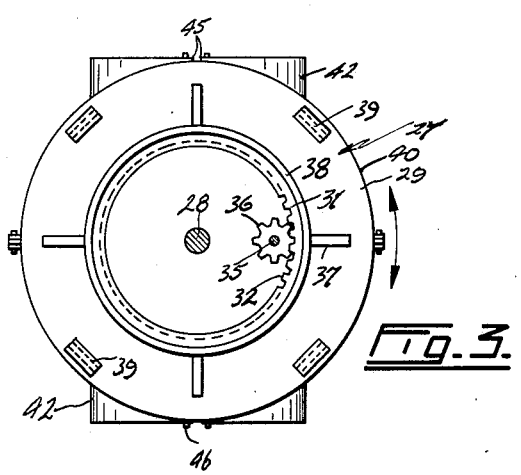
FIGURE 3 is a fragmentary sectional view of my device along the line 3—3 of FIG. 1.

Means are provided to permit the plate 27 to rotate through 360 degrees comprising an annular ring gear 31 secured to the base plate side 29 of the plate 27, said ring gear having internally formed teeth 32 and being situated concentrically upon the plate 27. An hydraulic motor 33 is secured upon the rear side 34 of the base plate and drives a shaft 35 which extends through the base plate carrying a gear 36 upon the lower end thereof which in turn engages the aforementioned ring gear 31. In this connection reference to FIG. 3 will show brace members 37 extending from the outer surface 38 of the ring gear to the plate 27 in order to stiffen and support the ring gear upon the plate 27.

A plurality of friction shoes 39 are secured to the plate 27 also upon the base plate side 29 thereof and adjacent the perimeter 40. These shoes engage the front side 41 of the base plate and stabilize the plate 27 upon the base plate thus relieving, to some extent, the strain on the stub shaft 28.

A pair of cylindrically shaped pole engaging jaws 42 are pivotally secured to the front side 43 of the plate 27 by means of lugs 44 being secured near the adjacent edges 45 of the jaws 42. Pivot pins 46 extend through these lugs and through further lugs 47 extending from the plate 27 and an hydraulic piston and cylinder assembly 48 extends between each jaw and lugs 49 secured to the plate 27 adjacent diametrically opposed points near the perimeter thereof as clearly shown in FIG. 1.

In operation, it should be appreciated that hydraulic piston and cylinder assemblies 15, 22 and 48 are connected to the hydraulic pump of the tractor as also is the hydraulic motor 33 and that conventional valving is provided to operate the various piston and cylinder assemblies as well as the hydraulic motor as desired.

When the device is in the position shown in full line in FIG. 1, a pole 50 lying upon the ground, can be engaged by the jaws 42 by the operation of hydraulic piston and cylinder assembly 48 and same can be elevated from the ground by operation of hydraulic piston and cylinder assembly 15. The device can then be moved to position shown in phantom in FIG. 1 by means of the hydraulic piston and cylinder assembly 22 thus holding the pole, adjacent one end thereof, clear of the ground and horizontally therewith.

By means of the hydraulic motor 33, the plate 27 together with the jaws and the pole can then be rotated through 90 degrees thus placing the pole in an upright position so that it can then be lowered into a prepared hole in the ground by means of lowering the beams 12 and adjusting the verticality by means of hydraulic piston and cylinder assembly 22.

Conversely, of course, a pole can be removed from a hole in the ground by the reversal of the above cited steps. The pole 50 can be placed, if desired, upon a truck, or alternatively, can be carried underneath the tractor between the wheels thereof merely by positioning the various components as hereinabove described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A pole handling device adapted to be mounted on and driven by a prime mover such as a tractor or the like; comprising in combination supporting structure extending from said prime mover, said supporting structure comprising a pair of spaced and parallel main beams pivotally connected by one end thereof to said prime mover and adapted to move in a vertical arc within limits, means to move said beams extending between said prime mover and said beams, a base plate pivotally secured to the other ends of said beams and spanning same, means extending between said beams and said base plate for pivoting said base plate within limits upon the ends of said beams, jaw carrying means secured to said base plate and a pair of pole gripping jaws secured to said jaw carrying means, and means extending between said pole gripping jaws and said jaw carrying means adapted to open and close said means, and a source of power from said prime mover for operating said device, said jaw carrying means comprising a jaw carrying plate journalled for rotation upon said base plate, and means to rotate said jaw carrying plate through 360 degrees, parallel to said base plate, said jaw carrying plate includes a centrally located stub shaft extending upon the base plate side thereof and extending through said base plate centrally thereof, means on said stub shaft to secure said jaw carrying plate to said base plate for rotation as aforesaid, a ring gear on said jaw carrying plate on the base plate side thereof, concentrically situated around said stub shaft, said means to rotate said jaw carrying plate engaging said ring gear and a plurality of friction spacer means between said base plate and said jaw carrying plate.

2. The device according to claim 1 in which said pole gripping jaws include a pair of semi-cylindrical pole engaging jaws, pivoted by adjacent edges thereof to said jaw carrying means and means extending between said jaw carrying means and said jaws to open and close same.

3. The device according to claim 1 in which said base plate is adapted to be pivoted between the horizontal and vertical planes.

4. The device according to claim 2 in which said base plate is adapted to be pivoted between the horizontal and vertical planes.

References Cited by the Examiner
UNITED STATES PATENTS

| | | |
|---|---|---|
| 2,488,767 | 11/1949 | Drott. |
| 2,725,996 | 12/1955 | Britton. |
| 2,788,143 | 4/1957 | Tendresse. |
| 2,814,396 | 11/1957 | Neal. |
| 2,831,589 | 4/1958 | Way. |

HUGO O. SCHULZ, *Primary Examiner.*

MORRIS TEMIN, *Examiner.*